United States Patent [19]
Kim

[11] Patent Number: 6,034,662
[45] Date of Patent: Mar. 7, 2000

[54] METHOD FOR TRANSMITTING REMOTE CONTROLLER POINTING DATA AND METHOD FOR PROCESSING RECEIVED DATA

[75] Inventor: Kyeong-su Kim, Suwon, Rep. of Korea

[73] Assignee: Samsung Electronics Co., Ltd., Rep. of Korea

[21] Appl. No.: 09/007,274

[22] Filed: Jan. 14, 1998

[30] Foreign Application Priority Data

Jan. 17, 1997 [KR] Rep. of Korea ......................... 97-1325

[51] Int. Cl.$^7$ ...................................... G09G 5/08
[52] U.S. Cl. ........................... 345/145; 345/146; 345/157
[58] Field of Search ..................... 345/145, 146, 345/157

[56] References Cited

U.S. PATENT DOCUMENTS

| | | | |
|---|---|---|---|
| 5,287,120 | 2/1994 | Okada et al. | 345/157 |
| 5,359,348 | 10/1994 | Pilcher et al. | 345/157 |
| 5,483,231 | 1/1996 | Sasabe | 340/825.57 |
| 5,587,558 | 12/1996 | Matsushima | 345/157 |
| 5,589,893 | 12/1996 | Gaughan et al. | 345/146 |
| 5,793,356 | 8/1998 | Svancarek et al. | 345/157 |

*Primary Examiner*—Richard A. Hjerpe
*Assistant Examiner*—Duc Dinh
*Attorney, Agent, or Firm*—Dilworth & Barrese

[57] ABSTRACT

A method of transferring remote controller pointing data for transferring data from a pointing device, in which power consumption is reduced, and a method for processing data received according to the transferral method, are provided. The method of transferring remote controller pointing data according to the present invention includes the steps of generating a leader pulse, indicating that the position of the pointer of a remote controller pointing device has begun to change, and generating a first pulse as a time reference point. The change of the position of the remote controller pointer is divided into vector components along X and Y axes, to obtain an X displacement and a Y displacement. The X displacement and the Y displacement data is then converted into X time data and Y time data. A second pulse is generated after a lapse of time corresponding to the X time data from the time at which the first pulse was generated, and a third pulse is generated after a lapse of time corresponding to the Y time data from the time at which the second pulse was generated. According to the present invention, it is possible to extend battery life by reducing power consumption of the remote controller.

13 Claims, 3 Drawing Sheets

FIG. 4A
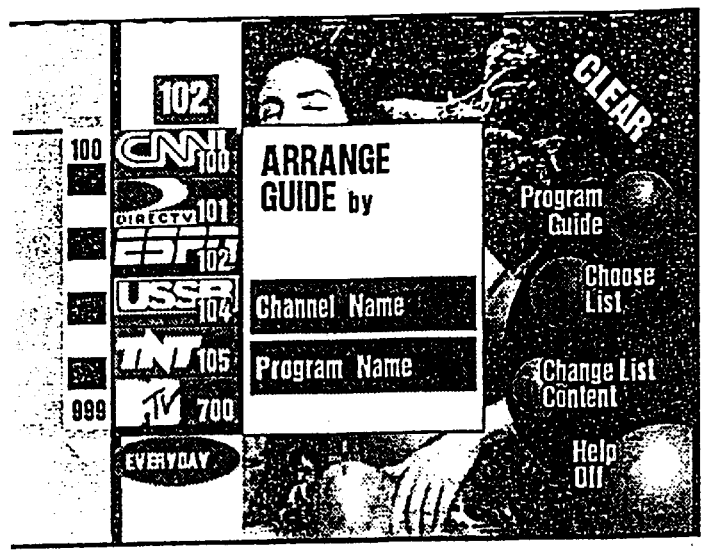
FIG. 4B
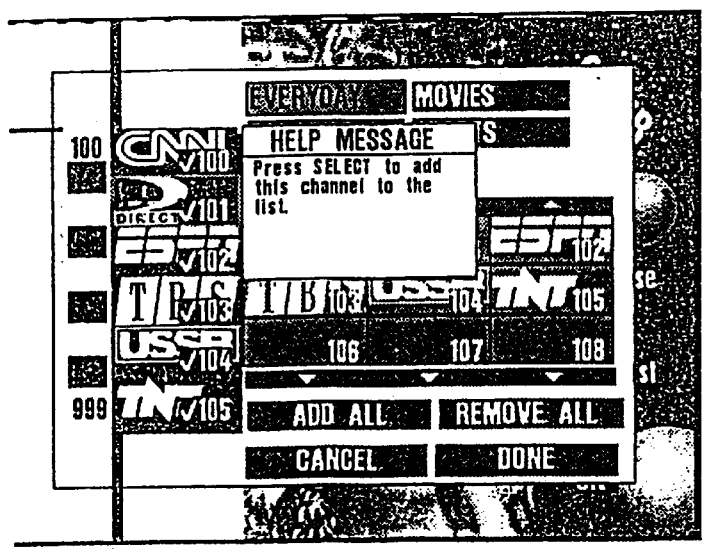
FIG. 5
| LEADER PULSE | CUSTOM CODE | CUSTOM CODE | KEY VALUE | KEY VALUE |
|---|---|---|---|---|

METHOD FOR TRANSMITTING REMOTE CONTROLLER POINTING DATA AND METHOD FOR PROCESSING RECEIVED DATA

BACKGROUND OF THE INVENTION

1. Field of the Invention

The present invention relates to a method for transmitting data, and more particularly, to a method for transmitting remote controller pointing data while reducing power consumption and a method for processing received data.

2. Description of Related Art

In general, when a key is pressed in a current remote controller, only a key code value corresponding to the key is transmitted to the controlled device.

However, as general household electrical appliances have more and more complicated functions, a method of selecting information by a conventional cursor key is inconvenient. As such, other ways of selecting from menus, and freely moving a cursor on a TV screen on which a complicated menu screen is displayed, are required, just as a personal computer requires a mouse.

In a general method for transferring data, in the case that a remote controller has four direction cursor keys (→, ←, ↑, and ↓), a pulse having the format shown in FIG. 5 is transmitted from the remote controller to the controlled device.

When the controlled device receives a leader pulse, it enters a data receiving mode and waits to receive a custom code. The custom code, which is uniquely set in each electronic device, determines whether the transmitted pulse is from its own remote controller. The main body determines the key value to thereby determine to which key the data belongs, when the custom code coincides with its own data format.

An inverted custom code and key value are also transmitted, to provide a kind of error detection. The received values are determined to be correct when the non-inverted values match the inverted values.

As mentioned above, since the position of a screen cursor can move in only four directions at angles of 90 degrees by four kinds of remote controller keys such as →, ←, ↑, and ↓, it is difficult for a user to rapidly move the cursor to a desired screen menu on a screen having various and complicated menus. Namely, in the complicated menus shown in FIGS. 4A and 4B, the four direction keys bear little relation to the actual necessary cursor movements. Therefore, a remote controller which can move a cursor freely at any angle, as can a personal computer mouse, is required. In such a method, pointing device data is transmitted.

When a pointing device is used, a cursor moves freely using a track ball, an air mouse, or a compression sensor.

In a conventional technology of transmitting pointing device data, 2 to 3 times as much power is consumed as in a conventional method of moving a cursor by pressing a direction key, since position displacement data must be continuously transmitted according to the displacement of the remote controller pointer. Accordingly, the life of a remote controller battery is reduced to ½ or ⅓.

SUMMARY OF THE INVENTION

It is an object of the present invention to provide a method of transmitting remote controller pointing data for transmitting pointing device data using a new data format, by which power consumption of a remote controller which transmits data is reduced.

It is another object of the present invention to provide a method of processing received data transmitted by the above method.

To achieve the first object, there is provided a method of transmitting remote controller pointing data, comprising the steps of: generating a leader pulse; indicating that the position of the pointer of a remote controller pointing device has begun to change, and generating a first pulse as a time reference point; dividing the change of the position of the remote controller pointer into vector components along X and Y axes, to obtain an X displacement and a Y adisplacement; converting the X displacement and the Y displacement into X time data and Y time data; generating a second pulse after a lapse of time corresponding to the X time data from the time at which the first pulse was generated; and generating a third pulse after a lapse of time corresponding to the Y time data from the time at which the second pulse was generated.

To achieve the second object, there is provided a method of processing received remote controller data which was transmitted by converting the position change of the pointer of the remote controller into time values, wherein the remote controller data includes a leader pulse, a first pulse, a second pulse, and a third pulse corresponding to the time values, comprising the steps of: determining whether an input signal contains a leader pulse by comparing the input signal with the leader pulse; generating a first measured value which is a measurement of the time between when the first pulse is received and when the second pulse is received; generating a second measured value which is a measurement of the time between when the second pulse is received and when the third pulse is received; and moving the position of a cursor along X and Y axes based on the first and second measured values.

BRIEF DESCRIPTION OF THE DRAWING

The above objects and advantages of the present invention will become more apparent by describing in detail a preferred embodiment thereof with reference to the attached drawings in which:

FIGS. 4A and 4B show examples of complicated menu screens; and

FIG. 5 is the format of data transmitted by a remote controller according to conventional technology.

DESCRIPTION OF THE PREFERRED EMBODIMENT

Hereinafter, a preferred embodiment of the present invention will be described in detail with reference to the attached drawings.

Figure 1:
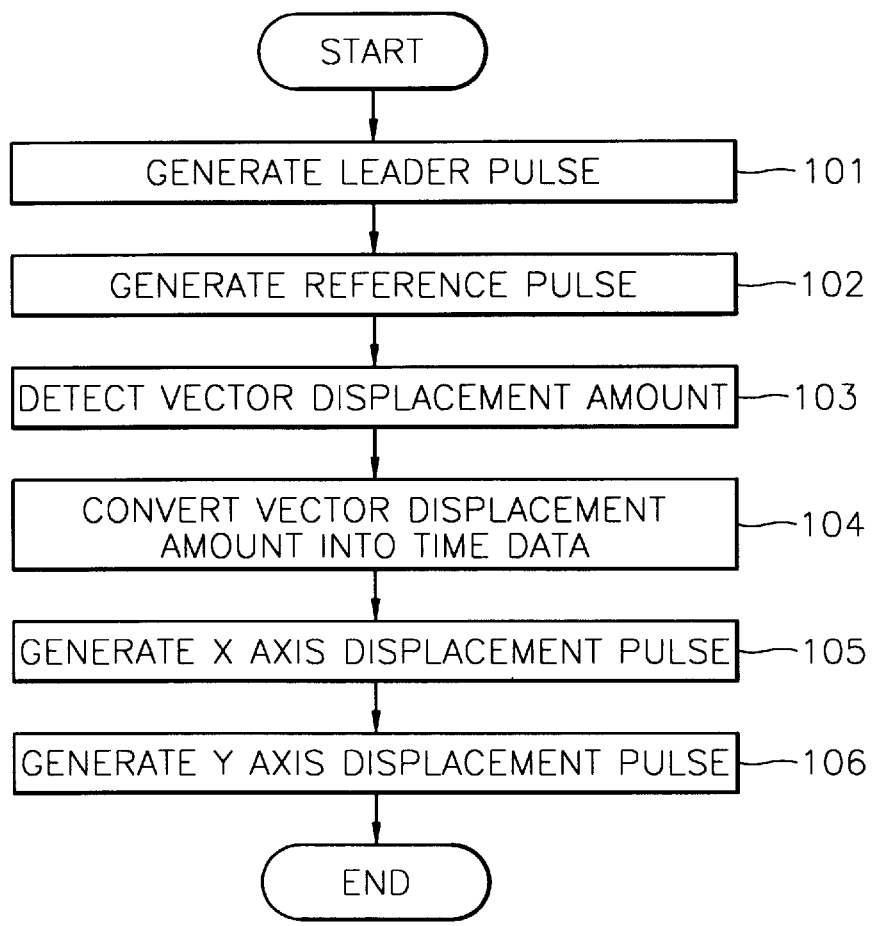
FIG. 1 is a flowchart of a remote controller pointing data transferring method according to the present invention.

Referring to FIG. 1, a remote controller pointing data transmitting method according to the present invention will be described as follows. In step 101, in the case that, for instance, to indicate the movement of a pointer, a key is input or the track ball of a pointing device begins to move, a leader pulse is generated to indicate the start of the data of the displacement amount of the remote controller pointer.

Namely, when the leader pulse is generated, a receiver enters a mode for receiving the displacement data of a pointer.

In step 102, a first pulse, which is a reference pulse having a uniform width and is part of the displacement data of the pointer, is generated after the leader pulse is generated.

In step 103, displacement amounts in the directions of X and Y axes are generated by sensing the displacement of the pointer of the remote controller and dividing the displacement amount into vector values of X and Y components. Namely, the difference between the present position of a pointer and the previous position of a pointer (i.e., the vector displacement value of the X and Y components, is detected).

In step 104, the vector divided displacement values of the components of the X and Y axes are converted into corresponding time data.

In step 105, a second pulse is generated after a lapse of time corresponding to the X axis displacement time data obtained in step 104, from the point of time at which the first pulse of the pointer displacement was generated. Therefore, the length of time between the first pulse and the second pulse corresponds to the displacement of the remote controller pointer in the X axis direction.

In step 106, a third pulse is generated after a lapse of time corresponding to the Y axis displacement time data obtained in step 104, from the point of time at which the second pulse was generated. Therefore, the length of time between the second pulse and the third pulse corresponds to the displacement of the remote controller pointer in the Y axis direction. Therefore, data of the position movement of the pointer by the remote controller can be constructed of only the leader pulse and the first, second, and third pulses, transmitted to the controlled device.

A transmitted signal including the displacement of the remote controller pointer generated through the above-mentioned steps has a pattern in which the displacement of the pointer is converted into the length of time between pulses.

The above leader pulse can be generated each time the displacement data of the X and Y axes of the pointer are transmitted. However, it is preferable that the leader pulse and the first pulse are only generated when the remote controller pointer begins to move or when a key on the remote controller is pressed, and thereafter only the second and third pulses for indicating the X and Y axes displacement of the pointer are repeatedly generated until an enter key is pressed to select from a menu. It is possible to transmit the information of the movement of the pointer position by repeatedly generating the first, second, and third pulses after generating the leader pulse only when the track ball begins to move, in order to prevent an error due to noise.

The power consumption of the remote controller is determined by the length of "high" pulse sections since a light emitting diode (LED) must be turned on during a period in which the logic value of a pulse is "high" when data is transmitted. Therefore, in the present invention, it is possible to reduce the power consumption compared to when using a conventional data format, since the displacement values of the X and Y axes are transmitted by only three pulses after the leader pulse is generated. It is possible to reduce the power consumption more effectively by making the width (i.e., the "high" section) of the first, second, and third pulses narrow.

Figure 2:
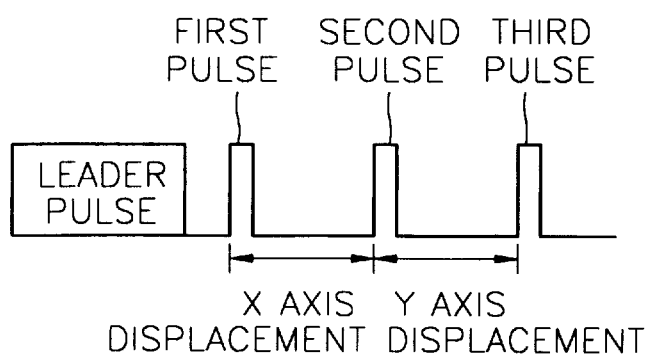
FIG. 2 is the format of data transmitted by a remote controller according to the present invention.
Figure 3:
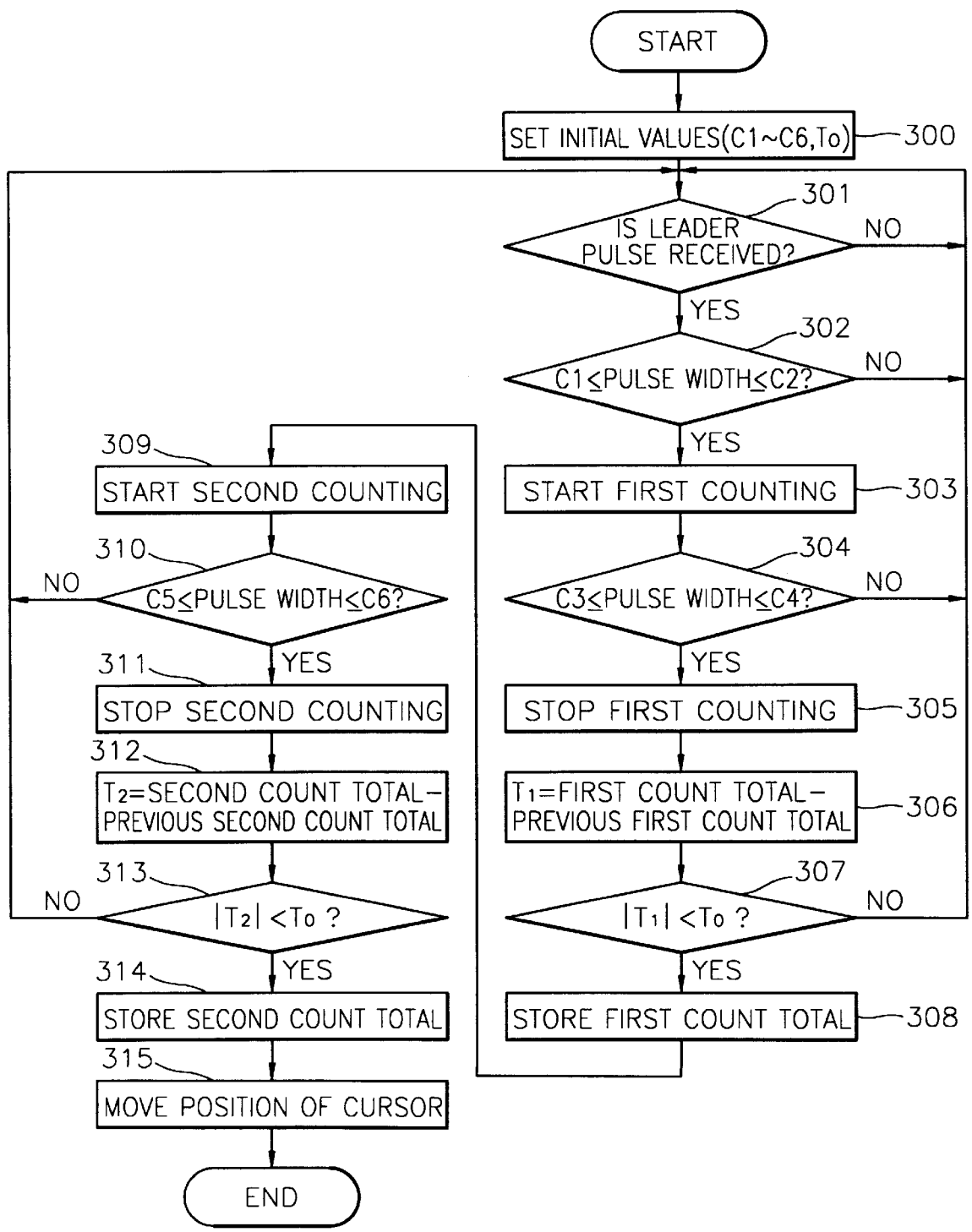
FIG. 3 is a flowchart of a received data processing method according to the present invention.

Referring to FIG. 3, the received data processing method according to the present invention will be described as follows. The data transmitted by the remote controller pointer is the leader pulse, the first pulse, the second pulse, and the third pulse as shown in FIG. 2. The distance between the first pulse and the second pulse represents X axis displacement. The distance between the second pulse and the third pulse represents Y axis displacement.

An operation of receiving the data from the remote controller pointer and moving the cursor will be described as follows. In step 300, the expected width of the first pulse is set, represented by a minimum value C1 and a maximum value C2. The difference between C1 and C2 depends on the allowable error in the value of the first pulse width. C1 and C2 are used to determine whether the data received from the remote controller pointer is the first pulse or not. In the same way, minimum values C3 and C5 and maximum values C4 and C6 corresponding to the second and third pulse widths, respectively, are set by the above method. At this time, in the case that the first, second, and third pulse widths included in the data from the remote controller pointer are equal, C1, C3, and C5 may be set to be equal, and C2, C4, and C6 may be set to be equal. Time data $T_0$ corresponding to the maximum amount of movement of the remote controller pointer during a fixed time is set.

In step 301, it is determined whether the leader pulse is received among input signals. Namely, it is determined whether a signal is input meeting the leader pulse format of the remote controller.

In step 302, the width of the input pulse after the leader pulse is measured. It is checked whether the measured width is between the minimum value C1 and the maximum value C2. Namely, it is determined whether the input pulse conforms with the data format of the first pulse. This is to prevent a noise pulse mixed with the input signal from being mistaken for the first pulse.

In step 303, in the case that the width of the input first pulse was between the minimum value C1 and the maximum value C2 in step 302, a first counter begins counting corresponding to the X axis displacement of the pointer. Here, the first counter starts counting at the time when the first pulse is detected and stops counting at the time when the second pulse is detected, in order to produce the X axis displacement.

In step 304, it is determined whether a next input pulse after the first pulse has a pulse width between the minimum value C3 and the maximum value C4. In the case that the width of the input pulse is between the minimum value C3 and the maximum value C4 in step 304, then step 305 is performed.

In the step 305, the first counter stops counting. The counting value of the first counter corresponds to the X axis displacement.

In step 306, a first difference value $T_1$ is generated by subtracting the previous first count total, which was counted in connection with the previous leader pulse and stored in a memory, from the first count total. Here, the previous first count total is a counting value of the first counter at the time when the first counter stoped counting according to the second pulse following the previous leader pulse, and thus is the same as the counting value stored in the first counter at the time when the first counter starts counting according to the first pulse following the current leader pulse. Therefore, the first difference value $T_1$ corresponds to displacement along the X axis between the previous and current pointer positions.

In step 307, a predetermined set value $T_0$ is compared with the absolute value of the first difference value $T_1$. The set value $T_0$ is larger than the maximum value by which the pointer can move during a unit of time. The count total corresponding to the displacement of the transmitted pointer cannot be changed by more than a certain value at one time. Therefore, in the case that the first difference value $T_1$ is greater than or equal to the set value $T_0$, it is considered that noise has corrupted the position displacement signal. Accordingly, the process returns to step 301 and the above steps are repeated.

In the case that the absolute value of the first difference value $T_1$ is smaller than the predetermined set value $T_0$, the first count total is stored in the memory in step 308. The stored data is used for calculating the X axis displacement in connection with the next leader pulse.

In step 309, a second counter begins counting corresponding to the Y axis displacement of the pointer. Here, the second counter starts counting at the time when the second pulse is detected and stops counting at the time when the third pulse is detected, in order to produce the Y axis displacement.

In step 310, it is determined whether a next input pulse after the second pulse has a pulse width between the minimum value C5 and the maximum value C6.

In the case that the width of the input pulse is between the minimum value C5 and the maximum value C6 in step 310, the counting of the second counter is stopped in step 311. If not, since the input pulse is abnormal data, the process returns to the step 301 and the above steps are repeated.

In the case that the input pulse is determined to be the normal third pulse, the second counter stops counting. The counting value of the second counter corresponds to the Y axis displacement.

In step 312, a second difference value $T_2$ is generated by subtracting the previous second count total, which was counted in connection with the previous leader pulse and stored in the memory, from the second count total. Here, the previous second count total is a counting value of the second counter at the time when the second counter stopped counting according to the third pulse following the previous leader pulse, and thus is the same as the value stored in the second counter at the time when the second counter starts counting according to the second pulse following the current leader pulse.

In step 313, the set value $T_0$ is compared with the absolute value of the second difference value $T_2$. The count total corresponding to the displacement of the transmitted pointer cannot be changed by more than a certain value at one time. Therefore, in the case that the second difference value $T_2$ is greater than or equal to the set value $T_0$, it is considered that noise has corrupted the position displacement signal. Accordingly, the process returns to the step 301 and the above steps are repeated.

In step 314, in the case that the second difference value $T_2$ is smaller that the set value $T_0$, the second count total is stored in the memory, since the input pulse is a normal displacement signal. The stored data is used for calculating the Y axis displacement in connection with the next leader pulse.

In step 315, the cursor is moved along the X axis by a distance corresponding to the first count total, and along the Y axis by a distance corresponding to the second count total.

Thus, as described above, the remote controller generates pointing data by converting the movement of the pointer into time periods corresponding thereto. The controlled device receives the pointing data, and converts it into X and Y axis displacements in order to move the cursor according to the X and Y axis displacements.

According to the present invention, it is possible to reduce power consumpion of the remote controller and thus prolong the life of the battery, by converting the displacement data of pointer into pulse timing data with respect to X and Y axes, transmitting the pulses to the controlled device, decoding the pulses, and moving the position of the cursor.

What is claimed is:

1. A method of transmitting remote controller pointing data, comprising the steps of:

generating a leader pulse for indicating a change of position of a pointer controlled by a remote controller pointing device; and generating a first pulse as a time reference point;

dividing the change of the position of the remote controller pointer into vector components along X and Y axes, to obtain an X displacement and a Y adisplacement;

converting the X displacement and the Y displacement into X time data and Y time data;

generating a second pulse after a lapse of time corresponding to the X time data from the time at which the first pulse was generated; and generating a third pulse after a lapse of time corresponding to the Y time data from the time at which the second pulse was generated.

2. The method of claim 1, wherein the leader pulse is generated only when the position of the remote controller pointer begins to change, and the first, second, and third pulses are repeatedly generated corresponding to the change of position of the remote controller pointer.

3. The method of claim 1, wherein the leader pulse and the first pulse are generated only when the position of the remote controller pointer begins to change, and the second and third pulses are repeatedly generated corresponding to the change of the position of the remote controller pointer.

4. A method of processing received remote controller data which was transmitted by converting the position change of a remote controller pointer into time values, wherein the remote controller data includes a leader pulse, a first pulse, a second pulse, and a third pulse corresponding to the time values, comprising the steps of:

determining whether an input signal contains a leader pulse;

generating a first measured value which is a measurement of the time between when the first pulse is received and when the second pulse is received;

generating a second measured value which is a measurement of the time between when the second pulse is received and when the third pulse is received; and moving the position of a cursor along X and Y axes based on the first and second measured values.

5. The method of claim 4, further comprising the step of determining the input signal as being corrupted by noise when the first measured value is larger than a predetermined set value.

6. The method of claim 4, further comprising the step of determining the input signal as being corrupted by noise when the second measured value is larger than a predetermined set value.

7. The method of claim 4, further comprising the step of measuring the widths of the first and second pulses and determining the input signal as being corrupted by noise when the widths are not the same as a predetermined set value.

8. The method of claim 4, further comprising the step of measuring the width of the third pulse and determining the input signal as being corrupted by noise when the width is not the same as a predetermined set value.

9. The method of claim 4, wherein said steps of generating are performed when the leader pulse is within the input signal.

10. A method of transmitting remote controller pointing data, comprising the steps of generating pointer data corresponding to a position change of a remote controller pointer and transmitting the pointer data to a controlled device, wherein said pointer data comprises:

a leader pulse, being uniquely defined to the controlled device, for indicating that the position of the remote controller pointer has started to change;

a first pulse, having a predetermined pulse interval, and being generated next to said leader pulse;

a second pulse, having a predetermined pulse interval, and being generated next to said first pulse after a lapse of time corresponding to an X axis displacement of the remote controller pointer; and a third pulse, having a predetermined pulse interval, an being generated next to said second pulse after a lapse of time corresponding to a Y axis displacement of the remote controller pointer.

11. The method of claim 10, wherein the first, second and third pulses have different pulse intervals.

12. The method of claim 10, wherein said pointer data comprises said leader pulse and the first, second and third pulses for a first position change of the remote controller pointer, and comprises only the first, second and third pulses for subsequent position changes of the remote controller pointer.

13. The method of claim 10, wherein said pointer data comprises said leader pulse and the first, second and third pulses for a first position change of the remote controller pointer, and comprises only the second and third pulses for subsequent position changes of the remote controller pointer.

* * * * *